| United States Patent [19] | [11] | 4,211,571 |
|---|---|---|
| Hartmann et al. | [45] | Jul. 8, 1980 |

[54] METHOD OF PRODUCING GAS CONCRETE

[75] Inventors: Armin Hartmann, Rheinau; Dieter Hums, Schrobenhausen, both of Fed. Rep. of Germany

[73] Assignee: Intong AB, Kumla, Sweden

[21] Appl. No.: 937,832

[22] Filed: Aug. 29, 1978

[30] Foreign Application Priority Data

Aug. 31, 1977 [DE] Fed. Rep. of Germany ....... 2739188

[51] Int. Cl.$^2$ .................. C04B 15/04; C04B 31/02
[52] U.S. Cl. ..................... 106/87; 106/109; 106/120
[58] Field of Search ................. 106/87, 109, 118, 120

[56] References Cited

U.S. PATENT DOCUMENTS

| 123,090 | 1/1872 | De Pouilly | 106/120 |
|---|---|---|---|
| 2,241,604 | 5/1941 | Knibbs | 106/87 |
| 2,880,100 | 3/1959 | Ulfstedt | 106/118 |
| 3,470,005 | 9/1969 | Flaschenberg et al. | 106/87 |

*Primary Examiner*—G. O. Peters
*Attorney, Agent, or Firm*—Larson, Taylor and Hinds

[57] ABSTRACT

A method of producing gas concrete. A castable mass is prepared by mixing water, a lime component including lime having a $t_{60}$ value of less than ten minutes, and a sand component. A calcium sulphate-containing component is subsequently admixed and a rising agent, such as aluminum powder, is subsequently admixed. The mass thus prepared is cast into molds and fabricated into gas concrete by the conventional steps of permitting the mass to rise and harden, cutting the hardened material to size, and hydrothermally curing. The process makes possible the use of readily available inexpensive lime material without the disadvantages normally resulting from use thereof.

14 Claims, No Drawings

METHOD OF PRODUCING GAS CONCRETE

The invention relates to a method of producing aerated or gas concrete (lightweight concrete), using pulverized quick lime and a calcium sulphate component.

It is customary to make the rising process of the production of gas concrete slow, in order to achieve an even growth of the mass, free of cracks, and to adjust the viscosity of the mass during the rising in such a way that the developing gas bubbles can distribute themselves homogeneously. Furthermore, the rising process should be slow in order to give the cement time to set, and thus to guarantee the stability of the mass. Moreover, it must be seen to it that an optimum reaction temperature develops in the rising mass. The rising gas concrete masses are also very sensitive to mechanical shaking when they reach their maximum height. Thus, in a process in which the rising mass is moved, for example in a mold wagon, it is advantageous that the mold wagons have reached the final spot where they shall stand during a period of time before the mass has fully risen.

These most important conditions are influenced in a decisive way by the development of hydrated lime in the mass, and consequently it is impossible to use just any pulverized lime as per DIN 1060. For the production of gas concrete, a dead burnt, pulverized lime, preferably white pulverized lime, is generally used. These special limes are burnt in coke shaft kilns. Their reaction velocity measured in accordance with the wet slaking curve method as per the test method of the Bundesverband der Deutschen Kalkindustrie (Prufverfahren des Bundesverbandes der Deutschen Kalkindustrie-Arbeitskreis Pruftechmik-Arbeitsblatter 1 und 11, as published in the journal "ZEMENT-KALK-GIPS" No. 4/1974, Bauverlag GmbH, Wiesbaden), is between 10 and 15 minutes at $t_{60}$ (the time required for the temperature to reach 60° C.). This velocity generally guarantees a slow rising process and that the rising maximum is reached at the required moment, and it also guarantees the necessary drying up of the mass. The dead burnt limes are also used in mixtures with cement. In such cases, they are instrumental in making the cement harden during the rising process and thus support the mass.

An important advantage of hard (or dead) burnt limes is that they reach higher end temperatures than other limes (wet slaking curve), which is important for the drying up of the gas concrete mass in order to be able to cut it without difficulty.

Hard (or dead) burnt limes are extremely expensive, however, and sufficient quantities are not available everywhere. Many attempts have thus been made to use softer burnt limes from i.e. oil or gas kilns with $t_{60}$-values under 10 minutes. These comparatively cheap limes which generally show a high sediment volume and a high volume yield have, however, too high reaction velocities and thicken too rapidly so that the rising process is disturbed. Attempts have therefore been made to retard the hydration of these reactive limes by adding substances (especially organic) to prolong the period of time of the slaking process. However, the characteristics of the slaking curve then changes in such a way that a retardation of the temperature development, and with that a slaking retardation, are initially achieved but later there is an acceleration. The wet slaking curve thus becomes S-shaped which is unsuitable for the purpose of gas concrete production, as is well known. Furthermore, the organic additives incur considerable extra costs.

Attempts have been made to control the slaking velocity of the lime components by adding calcium sulphate to the green gas concrete mixtures. However, it has turned out that an addition of calcium sulphate reduces particularly the strength of such gas concrete which is made of a mixture that contains mainly pulverized lime as binding agent. For that reason, the idea of an addition of calcium sulphate at the production of gas concrete without cement was abandoned and "hard burnt" (or dead burnt) lime was used instead.

For calcareous mixtures with cement, the addition of calcium sulphate can be omitted, as the slaking velocity of the lime can be reduced by the addition of cement. However, in such cases, the cement reduces the strength of the product. In mixtures which are rich in cement, it is possible adcording to German Patent DT-PS 1,646,580 to increase the strength—which is reduced due to the cement—by adding calcium sulphate to the mortar mixture in an amount of more than 2.5% by weight $SO_3$.

However, in all cases where lime is used as binding agent, alone or mixed with cement, the addition of calcium sulphate is accompanied by a granulation process of the lime so that an undisturbed hydration process cannot be guaranteed. Rejects and defective building units appear. The sulphates are presently being added either at the burning or at the grinding of the limes, or at the gas concrete production together with the other reaction partners. It has turned out, however, that an addition of sulphates in that way will lead to the intense granulation of the developing lime hydrates. (The slaking of finely ground quick lime is connected with the formation of new crystals of calcium hydroxide. These calcium hydroxide crystals will develop in different forms depending upon the circumstances. It is desirable in the manufacture of aerated concrete that the calcium hydroxide is finely dispersed since this will cause a greater stability of the cast mass. The addition of sulphates will, however, so influence the slaking process that the hydroxides form coarse grains with less stabilizing properties. The properties of the slaked lime in this respect can be checked by measuring the sedimentation volume and the sedimentation volume should be as high as possible.) If the calcium hydrate is checked with respect to sedimentation volume, very large sedimentation volumes form in the slaking water that does not contain sulphates. However, if there are sulphates in the water, the sedimentation volumes are small and the calcium hydrate becomes deposited as grits. Sulphate carriers lead to granulation even if they are added after the feeding and slaking of the lime. This formation of grains is extremely disadvantageous in connection with gas concrete production, as the stabilizing effect of the voluminous calcium hydrates in the rising gas concrete mass is lost. Consequently the gas concrete mass tends to fall back or to collapse altogether, especially for masses with minor contents of solid substances. The hydration curve/wet slaking curve is influenced in a similar way by calcium sulphate as by an addition of organic substances. It has thus until now been impossible for the idea of an addition of calcium sulphate to the gas concrete mass to become recognized, because, i.a., the properties of gas concrete building units that are produced by using hard burnt limes, could not be achieved.

It is an object of the present invention to retard soft burnt limes in case compounds for the production of gas concrete, especially burnt limes of $t_{60}$-values under 10 minutes, in such a way that their slaking behavior in the gas concrete mass corresponds to that of the hard burnt limes and thus to achieve a high casting stability without influencing the rising process in an unfavorable way.

The foregoing and other objects which will be apparent to those having ordinary skill in the art, are achieved by a method of producing gas concrete by which binding agents—containing lime or lime and cement as well as quartz sand or an equivalent $SiO_2$ component, calcium sulphate, rising agent, preferably aluminum powder and water—are mixed to a mass suitable for casting, the mass is cast into molds, and is left to rise and harden and can then be cut into shaped bodies and the shaped bodies can be hardened hydrothermally. It is a characteristic of the present method that for producing the mass suitable for casting, pulverized lime of a $t_{60}$-value under 10 minutes is pre-mixed with water or with water and sand, whereafter a component containing calcium sulphate is added and the mixing of the mass is continued and then the rising agent is added and the mass is after-mixed. By the pre-mixing, a surprisingly advantageous development of the calcium hydrate (i.e. calcium hydroxide) and an especially homogeneous distribution of the finely dispersed calcium hydrate is achieved. It is of advantage if lime, water and sand are pre-mixed together in a mixing process, and the calcium sulphate is then added, possibly together with cement. If the quantity of calcium sulphate in the cement is sufficient for slaking retardation, it is favorable to add the cement after the pre-mixing of the lime, sand and water. If the cements used are poor in sulphate, it is quite possible to add the cement in the pre-mixture, and to add the calcium sulphate necessary for slaking retardation, especially in the form of gypsum and/or anhydrite, after the pre-mixing. It is particularly advantageous to use the method according to the invention for pure lime mixtures and mixtures rich in lime.

It is surprising that the calcium sulphate loses its disadvantageous effects on the slaking process if it is not added until the pulverized lime starts reacting with the water and the slaking process has begun. Evidently, in its nascent state, the affinity of the calcium hydroxide is stronger to the reaction partners contained in the pre-mixture than the effect of the then added calcium sulphate.

On the contrary, the calcium sulphates, if they are added at the right moment, cause such a favorable retardation that the slaking behavior of the highly reactive lime becomes similar to that of hard burnt lime. Whereas an addition of gypsum normally slows down the gas development in such a way that the rising process gets a checked course and leads to rejects, the method of the present invention makes the mass rise quickly with an ideal consistency particularly so that reinforcements become surrounded by the mass without any formation of cavities or "shadows". The working rate can be considerably increased. Furthermore, less aluminum powder is required.

If sulphates are added immediately in the beginning of the slaking process, the rising of the mass is very much delayed, i.e. very long periods are required until the mass has reached its final rising maximum. This is of course unfavorable for production rate. If the sulphate carrier is added at the proper moment as described above, the mass rises very quickly, practically in the same way as it would rise without any addition of sulphates. The delaying effect of the sulphate which shows itself mainly as a very slow continued temperature increase does not start until the rising maximum has been reached. Consequently, there is a further advantage in connection with the production of reinforced units, i.e. the reinforcement bars are well surrounded by the quickly rising mass which has a low viscosity, whereas cavities (shadow formation) develop behind the reinforcement bars in the direction of rise of slowing rising, viscous masses of the kind one gets with high sulphate additions to the lime.

This behavior of the highly reactive lime cannot be confirmed by the wet slaking curve, as the reaction partners are missing with this measuring method. The later addition of the calcium sulphate is not at all suggested in the prior art, since the addition of very small quantities at short mixing periods with minor shearing forces is troublesome in all cases and it could be expected that the concentratedly added quantity would lead to local granulation of the lime before being distributed by the mixing process. However, this does not happen, probably for the reasons indicated above.

Besides, surprisingly enough, the gas concrete building units show high strengths, admitting of comparison with the strengths which are known from gas concrete building units made of hard burnt lime. Furthermore, it was surprising that gas concrete building units manufactured by the method according to the invention have a considerable better dimensional stability than previously known gas concrete building units. The quantity of calcium sulphate to be added is determined by the content of free CaO and the reactivity of the lime. It is also possible to add larger quantities of calcium sulphate without influencing the dimensional stability and strength of the gas concrete units in a negative way. The quantity is empirically established and depends, i.a. on the effect of the calcium sulphate on the rising and casting properties of the mass. The moment for addition as well as the periods of time for pre-mixing and continued mixing are also dependent upon these parameters. Yet, it has turned out that for calcareous mixtures of a calcium content of more than 50% by weight, particularly 52 to 65% by weight pulverized lime of $t_{60}$ values under 10 minutes, particularly between 2 and 6 minutes, in the binding agent and of $SO_3$-contents of more than 4.5% by weight preferably 4.5 to 12% and more, preferably between 6 and 12% by weight, in the form of calcium sulphate counted on the content of free CaO of the lime, it is especially favorable if water is put in the mixer first, whereupon the mixer is started and then lime, cement which is poor in sulphate, and sand, are added and pre-mixed 40 to 80, particularly 50 to 70 seconds, and after that the $SO_3$-containing component, preferably anhydrite, is added, the mixing is continued for approximately 25 to 40, preferably 30 to 35 seconds, more preferably 32 to 34 seconds, whereupon the rising agent, preferably aluminum powder is added, and the after-mixing is done for 20 to 40, preferably 25 to 30 seconds.

The following example is a more detailed description of the invention.

In order to produce a gas concrete building unit of quality group G 25 ("Quality group G25" means material manufactured according to the German DIN standards having a minimum compressive strength of 25 $kp/cm^2$), 420 kg of a highly reactive white pulverized lime of a $t_{60}$-value of 5 minutes and a CaO-content of 96% by weight, and 280 kg Portland cement PZ350 (a common type of Portland cement) and 1500 kg sand are put in a mixer in which 1200 l of water has already been poured, stirring all the time. This compound is pre-mixed for 60 seconds. 60 kg calcium sulphate anhydrite of an $SO_3$-content of 59% by weight is then added to the pre-mixture and mixing is continued for 32 seconds. After the aluminum powder has been thoroughly mixed in, the resulting slurry is poured into molds where the aluminum powder reacts with the alkaline water resulting in hydrogen bubbles which foam the material. The material rises and fills the originally partly filled molds completely. After a waiting time between 1 and 2 hours, the cast mass is cut with wires and conveyed into autoclaves in which it is subjected to steam of 10 atmospheres pressure for about 12 hours to effect hydrothermal curing. The molding mass shows no anomaly. After the curing, a gas concrete building unit of a dimensional stability of 0.1 mm/m is achieved. The dimensional stability is established by measuring the building unit immediately after the autoclave curing and after 28 days influence by an atmosphere of 40% relative moisture of air at 20° C., at which an equilibrium moisture content of 3% by weight has developed. The compressive strength of the gas concrete building unit is 35 kp/cm². The visual quality was splendid.

It is particularly advantageous if the method according to the invention for producing gas concrete building units of quality group G 25 is carried out with water/-solid ratios over 0.58. Preferably, water/solid ratios of the casting compound should be from 0.58 to 0.62. At the same time, it is then of advantage if the lime content and the water/solid ratio are adjusted to each other in such a way that the end temperatures of the rising mass will be 75 to 90, preferably 80 to 85° C. Thus, the mass gets ready for cutting at normal working rates and the dimensional stability of the ready unit is favorably influenced. Furthermore, in this connection, it is favorable that the aluminum powder to be added is as fine as possible.

It is important that using until now unknown kinds of calcium sulphate the casting stability of the mass cannot be guaranteed, if the method parameters are not kept and the development of the calcium hydrate in the mixer is prevented by the presence of sulphate concentrations.

The following table makes the results of invention clear. Mixtures of hard burnt and soft burnt limes are compared with respect to maximum rising temperature and strength and shrinkage of the autoclave cured units.

|  | Hard burnt | Soft burnt |
| --- | --- | --- |
| Lime (kg) | 340 | 340 |
| Cement (kg) | 220 | 220 |
| Sand (kg) | 1790 | 1790 |
| Anhydrite (kg) | — | 60 |
| Rising temperature(°C.) | 80 | 80 |
| Compressive strength (kp/cm²) | 25 | 35 |
| Shrinkage (mm/m) | 0.4 | 0.09 |

It is evident from the values of the table that products manufactured according to the method as per the invention are even superior to the conventional products. This superiority also applies to the behavior of the mass during the rising, especially regarding rising height, rising speed, consistency, temperature development, and end temperature as well as stability of the mass after reaching the maximum rising height.

By the invention, it is achieved that the mass rises quickly and without cracking or "shadows" and is stable and self-supporting and does not sink back or collapse, in spite of the addition of sulphate. Waiting times up to being ready to cut of 1 to 4 hours are achieved without having to adjust the end temperatures to over 90° C., as is the case for example with ordinary mixtures which are poor in cement and which require end temperatures of over 90° C. in order to dry out completely within 4 hours.

What is claimed is:

1. In a method of producing gas concrete in which a castable mass suitable for the production of gas concrete, said castable mass comprising water, a lime component, and a sand component, is cast into a mold where it is permitted to rise and harden into a mass capable of being cut into a desired shape and wherein the hardened material is hydrothermally cured to form a gas concrete product, the improvement wherein said castable mass is prepared by the steps of:

pre-mixing water, a lime component comprising pulverized lime having a $t_{60}$-value of under 10 minutes, and a sand component to form a homogeneous lime-sand pre-mixture;

mixing a calcium sulphate-containing component with said homogeneous lime-sand pre-mixture to form a homogeneous calcium sulphate-containing mixture; and mixing a rising agent with said homogeneous calcium sulphate-containing mixture to form said castable mass.

2. A method according to claim 1 wherein said homogeneous lime-sand pre-mixture comprises a cement component.

3. A method according to claim 2 wherein said cement component is poor in sulphate.

4. A method according to claim 1 wherein said lime component comprises pulverized lime having a $t_{60}$-value of from 2 to 6 minutes.

5. A method according to claim 1 wherein said lime-sand pre-mixture is made by first mixing said lime component with water, subsequently admixing said sand component, and, optionally, subsequently admixing a cement component.

6. A method according to claim 1 wherein said calcium sulphate-containing component is selected from the group consisting of gypsum and calcium sulphate anhydrite.

7. A method according to claim 1 wherein said castable mass comprises said pulverized lime in an amount of over 50% by weight and calcium sulphate in an amount of 4.5 to 12% by weight, as $SO_3$, based on the CaO content of the lime.

8. A method according to claim 7 wherein the lime content of the castable mass is from 52 to 65% and wherein the calcium sulphate content is from 6 to 12%.

9. A method according to claim 8 wherein the lime component, a cement component poor in sulphate, and the sand component are admixed in that order into water and mixed for 40 to 80 seconds, then the calcium sulphate-containing component is added and mixed for 25 to 40 seconds, and the rising agent is added and mixed for 20 to 40 seconds.

10. A method according to claim 9 wherein the lime component, cement component, sand component, and water are mixed for 50 to 70 seconds, the calcium sulphate-containing component addition is mixed for 30 to 35 seconds, and the rising agent addition is mixed for 25 to 30 seconds.

11. A method according to claim 1 wherein the water/solids ratio of the castable mass is from 0.58 to 0.62.

12. A method according to claim 1 wherein the lime content and the water/solids ratio are adjusted such that the castable mass, upon rising, develops an end temperature of 75° to 90° C.

13. A method according to claim 12 wherein said end temperature is from 80° to 85° C.

14. Aerated concrete having a dimensional stability of a maximum of 0.15 mm/m upon drying to an equilibrium moisture content of 3% by weight from an autoclave moisture content of about 30%.

* * * * *

UNITED STATES PATENT AND TRADEMARK OFFICE
Certificate

Patent No. 4,211,571                                              Patented July 8, 1980

ARMIN HARTMANN & DIETER HUMS

Application having been made by Armin Hartmann and Dieter Hums, the inventors named in the patent above identified, and Intong AB, Kumla, Sweden, the assignee, for the issuance of a certificate under the provisions of Title 35, Section 256, of the United States Code, adding the names of Klaus Friedrich Lippe and Werner Wetzig as joint inventors, and a showing and proof of facts satisfying the requirements of the said section having been submitted, it is this 12th day of July 1983, certified that the names of the said Klaus Friedrich Lippe and Werner Wetzig are hereby added to the said patent as joint inventors with the said Armin Hartmann and Dieter Hums.

Fred W. Sherling,
*Associate Solicitor*